Patented Jan. 7, 1936

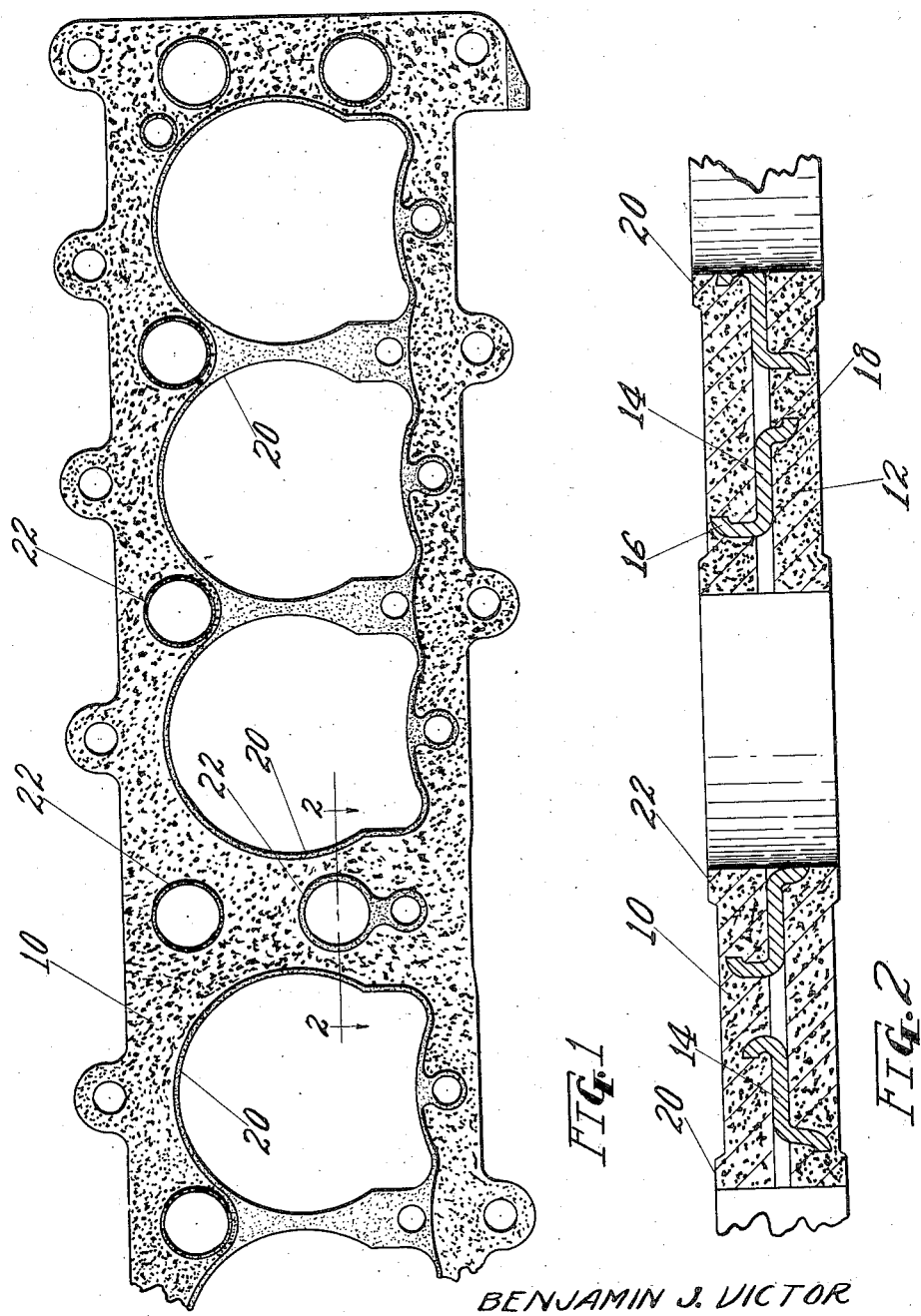

2,026,854

UNITED STATES PATENT OFFICE 2,026,854

GASKET WITH INTEGRAL MOLDED FLANGE

Benjamin J. Victor, Oak Park, Ill., assignor to Victor Manufacturing & Gasket Company, Chicago, Ill., a corporation of Illinois Application September 29, 1933, Serial No. 691,477

1 Claim. (Cl. 288—1)

This invention relates to an improved gasket, particularly one for use with internal combustion engines and the like, and has for one of its principal objects the provision of a gasket which, on account of its peculiar construction, will afford a much greater resistance to blowing out and breaking down at points of greatest wear and tear than will the ordinary gasket.

One of the important objects of this invention is to provide a gasket composed of a suitable packing material such as asbestos or the like either with or without any reinforcing element such as a metal sheet, and which is so constructed that an integral molded flange is provided at all those points and places where extra resistance to pressure and the like is necessary.

Another and further important object of the invention is the provision of a gasket for internal combustion engines or similar devices which can be made of any suitable material and which is preliminarily compressed over the larger portion of its area under a pressure far in excess of the pressure which is normally applied in use and whereby those portions not so compressed will provide integral thicker flanges or areas which under the normal compression in use will, accordingly, be brought into a maximum bearing surface with the parts between which the gasket is positioned.

Another and still further important object of the invention is to provide a gasket having an internal metal reinforcing element, which element has integral outwardly struck tangs on both faces thereof, whereby the packing material can be positively secured thereto and clinched in position thereon to form a unitary structure, this clinching action being made definitely positive by the considerable excess pressure used in constructing the gasket of this invention.

Other and further objects of the invention will be apparent from the disclosures in the accompanying drawing and following specification.

The invention, in a preferred form, is illustrated in the drawing and hereinafter more fully described.

In the drawing:

Figure 1 is a plan view of a portion of a gasket constructed in accordance with the principles of this invention, showing particularly the integral reinforcing flanges.

Figure 2 is a large sectional view taken on the line 2—2 of Figure 1 wherein is illustrated both the integral flanges and the internal metal reinforcing element and the clinching action thereof with regard to the packing material.

As shown in the drawing:

The reference numeral 10 indicates generally a sheet of asbestos or other suitable packing material such as that ordinarily used in the construction of gaskets, the same being preferably impregnated with a suitable composition to render it fire and water proof, and particularly adaptable for any special conditions under which the gasket is to be used.

The gasket is preferably composed of two layers of this packing material, the under layer being illustrated at 12 in Figure 2, the layers being joined and reinforced by an inner metallic layer 14 of sheet metal which has integral struck-out tangs or the like 16 and 18 which tangs penetrate to some extent the body of the sheets of packing material and under the pressure used in assembling the gasket, will be clinched or bent over into a positive gripping relationship with the packing material. This penetration of the tangs together with the adhesive qualities of the saturating composition for the asbestos provides a substantial unitary gasket which can be handled and shipped without fear of disintegrating.

It has been found in actual practice, however, that gaskets of this type, when subjected to the action of the hot gases of the internal combustion engine and also to the action of the cooling liquid, would have a tendency to either burn or wash away at points where most intimate contact with the burning gases and the cooling liquid took place. This, of course, was at the edges of the combustion openings and the edges of the holes for circulating cooling water or the like.

It was further found that providing an extra thickness of gasket at the edges adjacent the combustion openings and the water circulating openings would to a considerable degree prevent such burning or washing away, it having been found that this extra thickness provided for an increased pressure at these points or edges wherein a more intimate contact between the cylinder head and block or other parts resulted, and there was accordingly less liability of the burning gases or circulating water to find small crevices for entry which gradually became enlarged, resulting in leakage and blow-outs.

Under the present invention, an additional thickness of gasket material is provided all along the edges adjacent the combustion openings and at the edges of the openings through which the circulating cooling water passes by subjecting the remaining area of the gasket to a pressure, hydraulic or otherwise, greatly in excess of the pressure normally applied to the gasket in use.

This resulted in an additional compression of those areas, which compression was so high that the natural resiliency of the material was overcome and a permanent set resulted.

The dies or molds by means of which this pressure was applied were so constructed that the areas adjacent the combustion openings as shown at 20 in Figure 1 and the areas adjacent the water circulating openings as shown at 22 in Figure 1 were not compressed, thereby forming integral flanges which completely surrounded all these openings and which accordingly resulted in an additional wall thickness of the gasket at these points when in position.

It will be noted that the narrow areas between adjacent combustion openings were not subjected to this high pressure whereby solid flanges remained at these places.

Accordingly, when such a gasket is placed in position between the cylinder block or the cylinder head of an automobile or in any other like situation such as in a manifold, those portions which were not so highly compressed will immediately result in the formation of thicker walls surrounding the cylinder, water and similar openings which under the normal compression of the gasket when the fastening bolts are pulled down, will act to completely close and seal all possible spaces or crevices which might otherwise be apparent from inaccuracies in machining or the like, and therefore, accordingly all danger of escape of the products of combustion or of undesirable leakage of cooling liquid is positively eliminated.

It will be noted that no flanges are formed adjacent the openings for the bolts by means of which the parts are joined together and the gasket held in position so that these bolts can be pulled down very tightly, resulting in a much better sealing union all along the lines and areas which are defined by the integral flanges 20 and 22.

The enormous pressure used in forming this gasket will result in an unitary structure provided only that a suitable saturating composition for the packing material is used, and when a gasket having an interior perforated metal reinforcement is so compressed, the tangs or burrs surrounding the perforations will more thoroughly penetrate and grip the packing material, and the fact that certain of the projections or tangs will of necessity be present at the areas of no compression where the flanges are formed will not militate against the successful usage of the completed gasket in any way.

It will be apparent that herein is disclosed a novel gasket which, on account of the extra integral thickness produced at those points where such thickness is most necessary, will provide a gasket of longer life which will be more satisfactory in use throughout, while its ease of application and economy of manufacture unite to produce a commercially desirable product.

I am aware that many changes may be made in the ingredients and numerous details in the process varied throughout a wide range without departing from the principles of this invention, and I, therefore, do not purpose limiting the patent granted hereon otherwise than as necessitated by the prior art.

I claim as my invention:

A gasket, comprising sheets of compressed impregnated asbestos, an intermediate metal reinforcing layer therebetween, integral projections in the metal layer penetrating the asbestos, the gasket having cylinder and water openings therein, a substantial portion of the gasket area being densified by compression and leaving ribs of less density and greater resiliency than the compressed portion about said openings.

BENJAMIN J. VICTOR.